United States Patent
Taratorin et al.

(10) Patent No.: US 9,450,598 B2
(45) Date of Patent: Sep. 20, 2016

(54) TWO-STAGE DIGITAL DOWN-CONVERSION OF RF PULSES

(71) Applicant: Guzik Technical Enterprises, Mountain View, CA (US)

(72) Inventors: Alexander Taratorin, Palo Alto, CA (US); Anatoli B. Stein, Atherton, CA (US); Lauri Viitas, Palo Alto, CA (US); Igor Tarnikov, Palo Alto, CA (US)

(73) Assignee: Guzik Technical Enterprises, Mountain View, CA (US)

( * ) Notice: Subject to any disclaimer, the term of this patent is extended or adjusted under 35 U.S.C. 154(b) by 0 days.

(21) Appl. No.: 14/992,364

(22) Filed: Jan. 11, 2016

(65) Prior Publication Data

US 2016/0241253 A1    Aug. 18, 2016

Related U.S. Application Data (60) Provisional application No. 62/107,863, filed on Jan. 26, 2015.

(51) Int. Cl.
*H04B 1/26* (2006.01)
*H03M 1/12* (2006.01)
(Continued)

(52) U.S. Cl.
CPC ............ *H03M 1/1245* (2013.01); *G01S 7/352* (2013.01); *G01S 2007/358* (2013.01); *H04B 1/0039* (2013.01)

(58) Field of Classification Search
CPC .. H04B 1/001; H04B 1/0028; H04B 1/0014; H04B 1/0017; H04B 1/0021; H04B 1/0039
USPC ................ 455/313, 314, 315, 316, 318
See application file for complete search history.

(56) References Cited

U.S. PATENT DOCUMENTS

| | | | | |
|---|---|---|---|---|
| 5,878,089 A | * | 3/1999 | Dapper | H03D 3/009 323/304 |
| 5,909,193 A | * | 6/1999 | Phillips | H04B 1/16 342/410 |

(Continued)

FOREIGN PATENT DOCUMENTS

| EP | 1464111 B1 | 3/2012 |
|---|---|---|
| EP | 2533057 A2 | 12/2012 |

*Primary Examiner* — Linh Nguyen
(74) *Attorney, Agent, or Firm* — Burns & Levinson LLP; Joseph M. Maraia (57) ABSTRACT

A two-stage digital down-conversion device for optimal detection of varying RF pulses incorporates a front end analog to digital converter (ADC), which samples an input RF signal and performs a first stage digital down conversion in wide bandwidth by means of two digital local oscillator multipliers, low pass filters and decimators. A stream of first stage quadrature I and Q samples is analyzed by a first stage I/Q processor. The I/Q processor generates an RF pulse trigger based on a first-stage envelope signal, center frequency and frequency span data which are used for a second stage narrow band digital down-conversion. The second stage digital down-conversion is based on mixing the first stage I and Q data samples with a second stage local oscillator, further low pass filtering and decimation using a second bandwidth. A stream of second stage I/Q quadrature samples has an optimal signal to noise ratio and allows accurate estimation of RF pulse parameters (magnitude, phase and frequency) by means of a second I/Q signal processor and/or by storing second I/Q data for subsequent processing and analysis.

15 Claims, 5 Drawing Sheets

(51) Int. Cl.
*G01S 7/35* (2006.01)
*H04B 1/00* (2006.01)

(56) References Cited

U.S. PATENT DOCUMENTS

| | | | |
|---|---|---|---|
| 6,697,603 B1 * | 2/2004 | Lovinggood | H04B 7/15528 370/315 |
| 7,127,227 B2 * | 10/2006 | Takahiko | H03D 7/166 455/313 |
| 7,158,574 B2 * | 1/2007 | Vishakhadatta | H04B 1/0003 375/219 |
| 7,652,619 B1 | 1/2010 | Hibbard et al. | |
| 7,941,111 B2 | 5/2011 | Cutler et al. | |
| 8,295,371 B2 * | 10/2012 | Rick | H03G 3/3068 375/260 |
| 8,532,236 B2 * | 9/2013 | Kerth | H04B 1/0003 375/306 |
| 8,644,429 B2 | 2/2014 | Krishnan et al. | |
| 8,803,730 B2 | 8/2014 | Jiang | |
| 2005/0270219 A1 * | 12/2005 | Dwelly | G01S 13/32 342/22 |
| 2010/0098195 A1 * | 4/2010 | Nekhamkin | H04L 27/0014 375/344 |
| 2013/0094616 A1 | 4/2013 | Laporte | |
| 2014/0213197 A1 | 7/2014 | An et al. | |
| 2015/0019051 A1 * | 1/2015 | Malaga | G08G 5/02 701/17 |

\* cited by examiner

TWO-STAGE DIGITAL DOWN-CONVERSION OF RF PULSES

CROSS-REFERENCED TO RELATED APPLICATIONS

This application claims the benefit of U.S. Provisional Application Ser. No. 62/107,863, filed on Jan. 26, 2015, the disclosure of which is incorporated herein by reference in its entirety.

TECHNICAL FIELD

The present disclosure relates generally to signal processing and more particularly to systems and methods for digital down conversion of RF pulses.

BACKGROUND

This disclosure addresses digital detection and analysis of RF pulses, for example radar pulses when the pulse parameters (duration, frequency and span) are varying and unknown. It is assumed that pulses of variable duration, frequency and span do not overlap and are confined within a wide sub-band. In many applications, incoming pulses have to be detected and pulse parameters (amplitude, phase and frequency) need to be determined in real or near-real time. Typically, RF pulses in a bandwidth of interest may come at random time intervals or have a low duty cycle, and, as a result, RF pulse triggering is required in order to process and/or store only relevant pulse data.

A conventional method for digital detection and measurement of RF modulated pulses is based on down-conversion. Analog down-conversion systems based on frequency mixers and low-pass filtering are well known. However analog down-conversion implementations have many disadvantages compared to digital implementations. For example, detection bandwidth and down-conversion frequency cannot be easily changed due to hardware limitations and local oscillator settling times. Analog frequency mixers are known to have stability issues, phase noise and non-linearity, resulting in distortions of down-converted signals.

Digital down-conversion (DDC) methods are based on analog to digital conversion of an incoming signal followed by numerical oscillator mixing, low pass filtering and down sampling. Such methods are known to have high stability, accuracy and flexibility compared to analog implementations. Principles of digital down-conversion are described in J. Alter and J. Coleman "Radar Digital Signal Processing" published in "Radar Handbook" by M. Skolnik, McGraw Hill, 2008. Similar methods are described in "Fundamentals of radar signal processing" by M. A. Richards (Mc.Graw-Hill, 2014, pp. 133-137).

In order to use digital down-conversion for RF signal detection and measurement of pulse parameters, parameters of the pulse (frequency span, center frequency) need to be known in advance. If the center frequency and span are variable, more complicated detection schemes are required. This problem has been addressed in a number of patents and publications.

U.S. Pat. No. 7,652,619 to Hibbard et al., entitled "Systems and Method Using Multiple Down-Conversion Ratios in Acquisition Windows," discloses a system for performing different sampling rates on incoming signals in order to perform down-conversion with different timing resolution, obtaining high and low resolution pulses. High resolution signals are used for far-range applications, while low resolution signals are used for low-range data processing.

U.S. Pat. No. 7,941,111 to Cutler et al., entitled "Method and System for Detecting an RF Signal," discloses a system for digitizing and storing data from multiple RF receivers. A separate trigger circuit determines whether an RF signal has been detected, and selected digitized data is transmitted to a central processing device for demodulation.

U.S. Pat. No. 8,644,429 to Krishnan et al., entitled "Digital Down Conversion and Fast Channel Selection of Narrowband Signals Using a Wide Band RF Tuner," discloses a receiver which demodulates an input signal in a wide band. At a second stage, a specific narrow band signal is selected by a spectrum selection control unit and this narrow-band signal is demodulated.

U.S. Pat. No. 8,803,730 to Jiang, entitled "Radar Pulse Detection Using a Digital Radar Receiver," discloses a system and apparatus for radar pulse detection operating in a dense electronic environment. In order to separate multiple radar signals, a procedure called "digital channelization" is used. The "digital channelization" is based on applying a bank of band-pass filters in order to detect signals in multiple frequency bands. However, implementing the bank of band pass digital filters is challenging for high speed signal processing. The method proposed in this patent is based on using high speed analog to digital conversion, down-sampling this signal and applying a digital band pass filter bank for the down-sampled signals. Then, the outputs of the narrow-band signals are combined in a decision-logic algorithm which determines the presence of radar pulse in the selected band or several bands.

U.S. Patent Application Publication No. 2013/0094616 to Laporte, entitled "Digital Down Conversion and Demodulation," discloses a method and apparatus for down-conversion and demodulation of RF signal. A sampling frequency is chosen based on a bandwidth of interest. This application is applicable to wireless communication with multiple detection bands, and does not address multi-stage demodulation.

European patent EP 2,533,057 to Martin, entitled "Interleaved Digital Down-Conversion on a Test and Measurement Instrument," discloses down-conversion performed on multiple channels of an input signal, so each channel is down-sampled and processed at low rate. This allows parallel computation of band-pass signals given a plurality of memory and down-conversion operations.

European patent EP 1,464,111 to Fernandez-Corbaton et al., entitled "Multiple Analog and Digital Down-Conversion," discloses a method for down-conversion. The patent discloses a two-stage down conversion method, combining a first analog stage with a wide bandwidth and a second digital stage having a narrower bandwidth. The frequencies of the first and second down-conversion oscillators can be adjusted after an initial down-conversion, based on error signals.

However, none of the prior art patents and application do address the issue of optimal detection and estimation of RF pulse parameters. U.S. Pat. No. 8,644,429 and US Patent Application Publication No. 2013/0094616 disclose adjustment of down-conversion frequency, but require one or several narrow band filters, based on the assumption that the detected signal is continuous; those patents do not address pulse parameter estimation. Similarly, the methods described in U.S. Pat. No. 7,652,619 and U.S. Pat. No. 7,941,111 describe either variable sampling rate or multiple RF receiver implementations, and are not relevant to a standard digital down-conversion implemented with a fixed sampling rate ADC. U.S. Patent Application Publication No.

2014/0213197 allows optimal selection of a demodulation bandwidth; however, that application is related to a continuous wave communication system, assuming that the signal of interest is present in the bandwidth continuously, and does not discuss either down-conversion or pulse parameter estimation.

U.S. Pat. No. 8,803,730 and EP Patent No. 2,533,057 require a multi-bank set of filters, and address detection of signals in multiple narrow bands. These patents allow detection of multiple radar pulses in terms of envelope and duration; however, estimation of phase and frequency is not addressed.

Finally, EP Patent No. 1,464,111 is directed to continuous communication applications when a receiver has to be accurately tuned to the transmitter in a dense communication environment. Such methods are not applicable to real time detection and do not address pulse parameter estimation.

Therefore, the above-cited prior art methods do not address the most important issues for detection of RF pulses with unknown parameters: real time RF pulse triggering, and double-stage digital down conversion with optimal down-conversion parameters.

SUMMARY

A two stage digital down-conversion system for optimal detection of RF pulses is described. A first stage digital down-conversion is performed in a wide bandwidth, resulting in first stage quadrature I/Q samples. These samples are used to calculate RF pulse envelope, phase and frequency estimates. An RF pulse trigger is generated using the first stage quadrature envelope signal, and that RF pulse trigger determines a range of first-stage I/Q samples used for a second-stage down-conversion. First-stage center frequency and frequency span estimates are used to set frequency and bandwidth of a second stage digital down-conversion, based on first stage quadrature I/Q samples. The second-stage narrow-band down-converted quadrature signals have optimal signal to noise ratio and allow accurate measurements of the RF pulse amplitude, phase and frequency parameters.

DESCRIPTION OF THE FIGURES

(FIG. 5(*b*)—pulse frequency).

DETAILED DESCRIPTION

Figure 1:
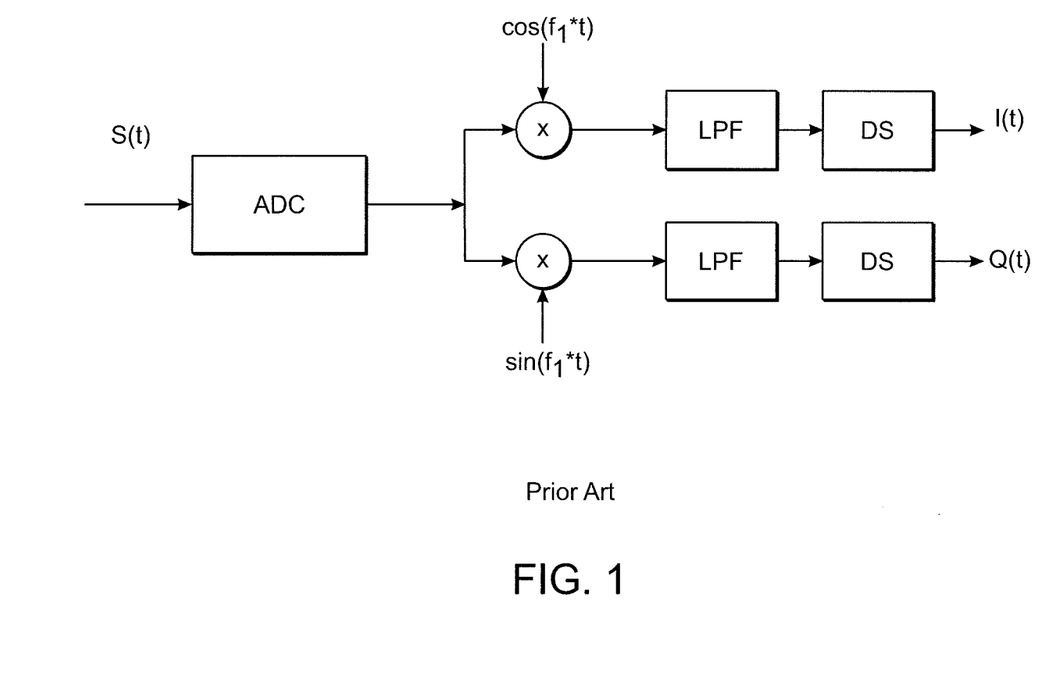
FIG. 1 depicts, in block diagram form, a general prior-art method of digital down-conversion.

Basic digital down-conversion (DDC) methods are well known in prior art. A typical block-diagram is depicted in FIG. 1. An analog input signal is digitized by a high speed analog-to-digital converter (ADC). Digital samples from the ADC are multiplied by quadrature components, represented by sine and cosine local oscillator signals at a given local oscillator frequency. Quadrature components are low-pass filtered in a pre-determined bandwidth in order to reject undesirable spectral components and then down-sampled. This operation produces quadrature components I(t) and Q(t) in the desired bandwidth. Quadrature components are used to calculate a signal envelope E(t), phase $\phi$(t) and Frequency f(t) given by the following equations:

$$E(t) = \sqrt{I(t)^2 + Q(t)^2}$$

$$\phi(t) = \mathrm{arc}tg\left(\frac{Q(t)}{I(t)}\right)$$

$$f(t) = \frac{d\phi(t)}{dt}$$

Figure 2:
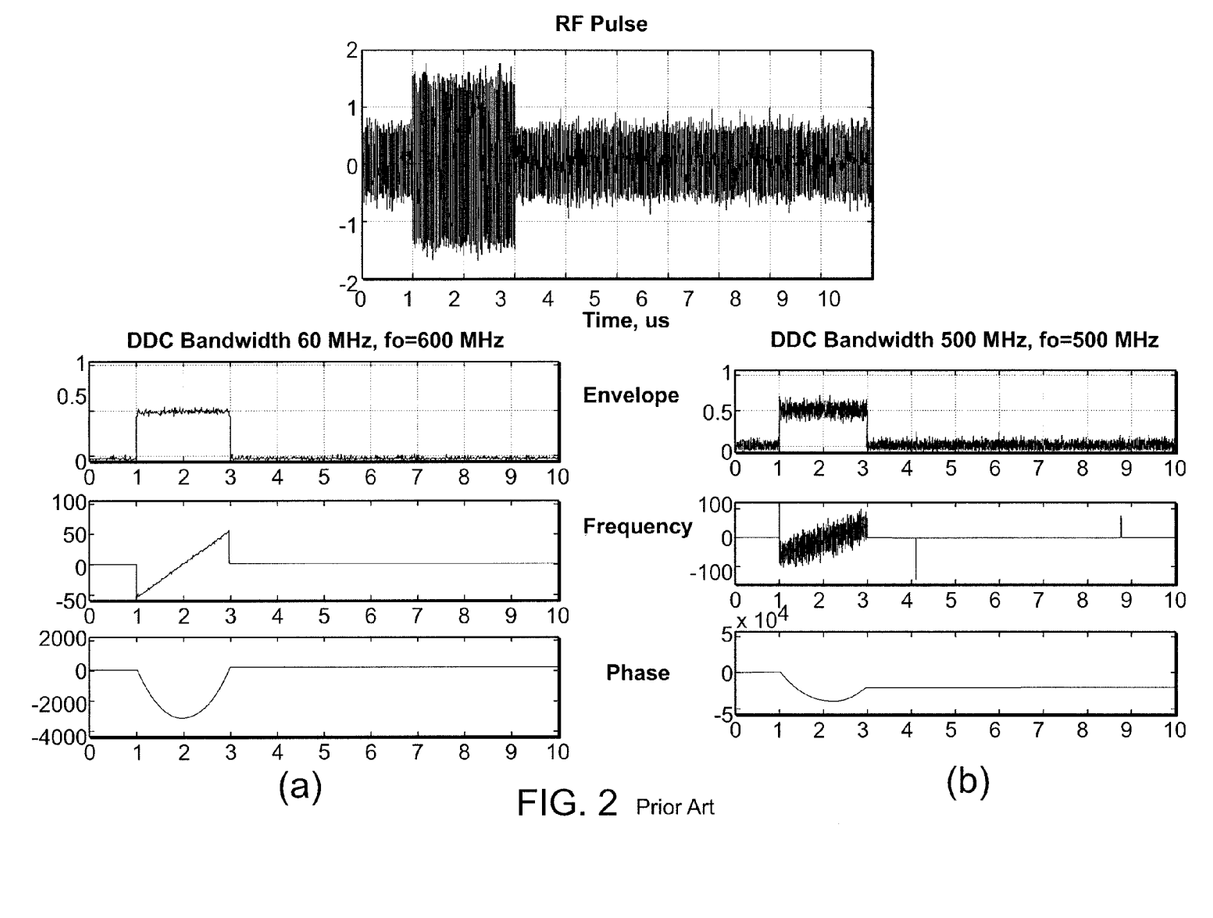
FIG. 2 illustrates an RF pulse with 10 dB SNR and 50 MHZ frequency span. Prior art single stage digital down-conversion results obtained with a 60 MHz DDC bandwidth (FIG. 2(*a*)) and a 500 MHz DDC bandwidth (FIG. 2(*b*)) are shown; the 500 MHz envelope and frequency estimates are noisy.

An illustrative example of a frequency modulated pulse starting at 1 us and ending at 3 us is shown in FIG. 2. This pulse has linear frequency modulation with a 100 MHz span, starting at 550 MHz and ending at 650 MHz. Signal samples are taken with a 10 Gs/s analog to digital converter with a 5 GHz analog bandwidth. The signal to noise ratio of the input signal equals 10 dB, and down-conversion is done with an optimal 50 MHz bandwidth and results in robust envelope, phase and frequency detection (quadratic phase and linear frequency).

In order to perform optimal down-conversion, the center frequency and frequency span need to be known. If incoming RF pulses have variable (e.g. hopping) frequency and span, down-conversion needs to be performed in a frequency range, which is wide enough to cover expected range of RF pulses. For example, if all incoming RF pulses can occur at any frequency within a 1 GHz range, digital down-conversion is required with a 500 MHz center frequency and a 500 MHz bandwidth. In this case, all frequency components of the incoming pulses within 1 GHz bandwidth will be captured during down-conversion. However, wide-band down conversion operation in low SNR (Signal to Noise Ratio) conditions, results in degradation of pulse parameter measurements. This can be easily seen on results of down-conversion shown in FIG. 2*b*, performed using a 500 MHz center frequency and a 500 MHz bandwidth. Since the down-conversion center frequency deviates from the RF pulse center frequency, the phase estimate will be skewed. Also, strong frequency noise (about 25 MHz RMS value) caused by wide detection bandwidth, and significant magnitude noise, complicate high accuracy analysis of pulse parameters.

Estimates of signal and noise after down-conversion can be obtained from the following calculations. If the initial signal bandwidth is given by BW and the low pass bandwidth of down-converted signal is W, then the envelope (magnitude) SNR can be calculated using the following expression:

$$\mathrm{DDC\_SNR} = \mathrm{Input\_SNR} + 10\log\frac{W}{BW}$$

Assuming an original analog input bandwidth of 5 GHz (corresponding to 10 Gsamples/s ADC sampling) and using this equation for the initial input SNR of 10 dB, the envelope SNR for a 500 MHz detection bandwidth is about 20 dB. Optimal detection of an RF pulse with 100 MHz frequency span with a 50 MHz bandwidth, achieves a 30 dB SNR, i.e. wide band detection for the envelope signal results in a 10 dB SNR loss.

Phase and frequency noise after down-conversion can be estimated using signal-noise vector representation. Assuming that noise in the down-converted bandwidth N(W) is orthogonal to the signal S(W) (this corresponds to maximum phase error), phase noise can be calculated as $$N[\phi] = \text{arctg}\frac{N(W)}{S(W)} = \text{arctg}\left(\sqrt{\frac{W}{BW}}\ 10^{-\frac{SNR}{20}}\right)$$

Frequency is obtained by the phase derivative normalized to the sampling rate and detection bandwidth $$f = \frac{d\phi}{dt}\frac{\text{Sampling}}{2\pi}\frac{W}{BW}$$

Taking into account that the derivative for a Gaussian random variable corresponds to a 3 dB SNR loss, the frequency noise is:

$$N[f] = \frac{\text{Sampling}}{\sqrt{2}\pi}\frac{W}{BW}\text{arctg}\left(\sqrt{\frac{W}{BW}}\ 10^{-\frac{SNR}{20}}\right)$$

These equations and numerical simulations predict that for a 10 dB input SNR and a 500 MHz down-conversion bandwidth, the RMS value of the frequency noise equals 22 MHz. At the same time, optimal RF pulse detection with a 100 MHz frequency span, and 50 MHz bandwidth, can achieve only a 0.71 MHz frequency RMS error.

The above examples and calculations indicate that wide bandwidth down-conversion results in considerable SNR degradation and errors in estimation of RF pulse parameters. Therefore, optimal bandwidth selection is required for high accuracy detection of RF pulses and estimation of pulse parameters.

The method of this disclosure overcome the above-mentioned limitation by using a two-stage digital down-conversion, where the parameters of the second down-conversion stage are determined by the first down-conversion stage output. A two-stage digital down-conversion system is depicted in the block-diagram of FIG. 3.

Figure 3:
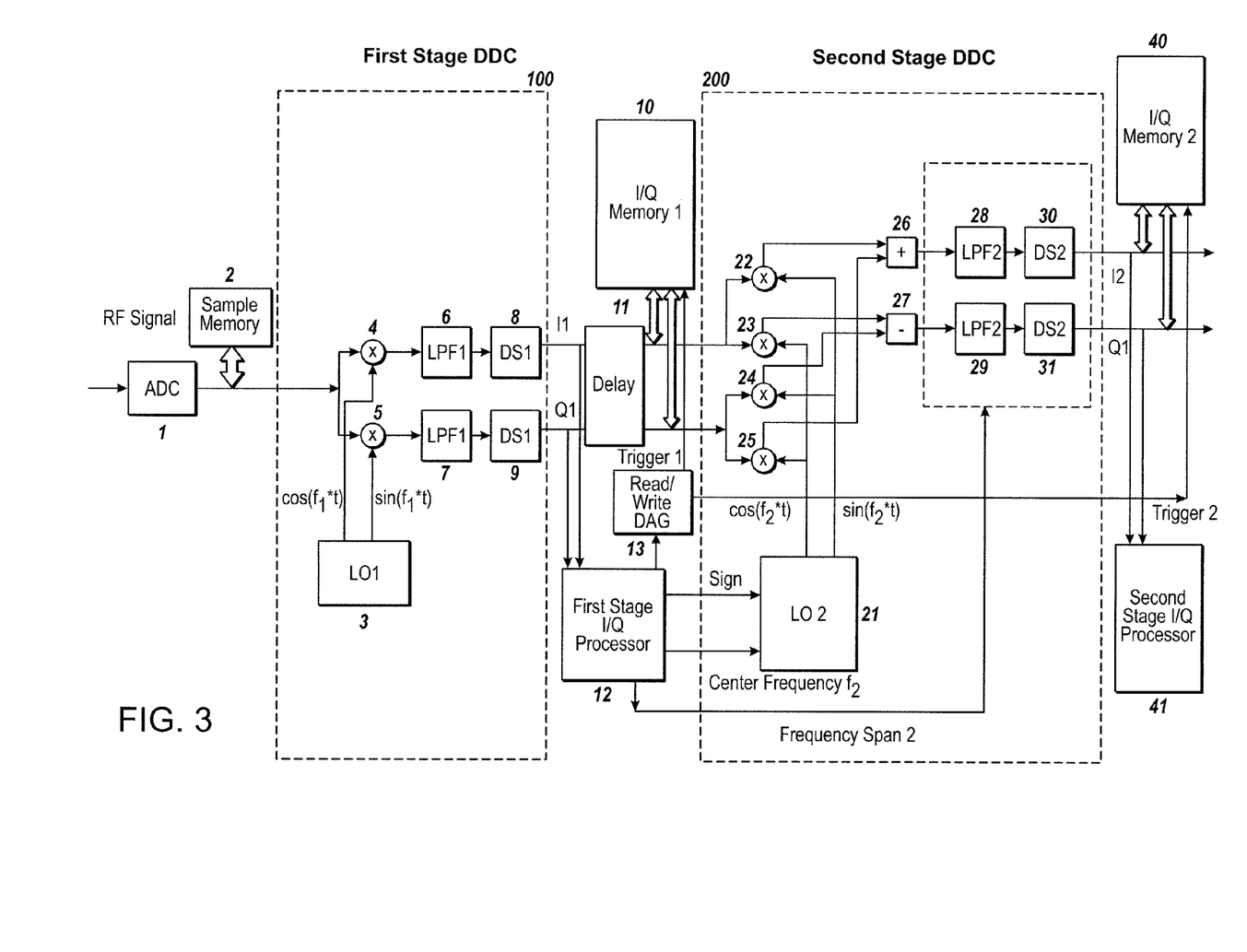
FIG. 3 depicts in block diagram form, an exemplary two-stage digital down-conversion system of the current disclosure.

In that figure, an analog input signal is digitized by high-speed ADC 1. If digital down-conversion is performed in real time, ADC samples are continuously streamed to the input of first-stage (wide-band) DDC module 100. If real-time down-conversion is not possible, ADC samples may be stored in optional sample memory 2.

The ADC samples are processed by first-stage DDC module 100, consisting of two multipliers 4 and 5 with first stage local oscillator LO1 3, generating sine and cosine signals at a first stage down-conversion frequency f1, followed by first stage low pass filters LPF1 6 and 7, and signal decimators DS1 8 and 9. Digital down-conversion may be performed using a dedicated signal processor or implemented in FPGA. The output of the first stage DDC module 100 is represented by first stage quadrature I1 and Q1 samples. These samples are streamed to first stage I/Q processor 12 and delay buffer 11. Delay buffer 11 delays first stage I and Q samples in order to capture first stage I/Q samples corresponding to the onset of the RF pulse as will be described below.

First stage I/Q processor 12 is implemented using a high speed FPGA or dedicated signal processing module. I/Q processor 12 accepts I1 and Q1 data samples and performs calculations of the first-stage signal envelope:

$$E1(t)=\sqrt{I1(t)^2+Q1(t)^2}$$

Incoming RF pulses may have a low duty cycle and variable duration. Therefore, it is necessary to form an RF pulse trigger signal to select only those samples which are representative of the signal of interest. This is done by read/write data address generator (DAG) 13. Data address generator 13 determines the RF pulse start and duration.

Figure 4:
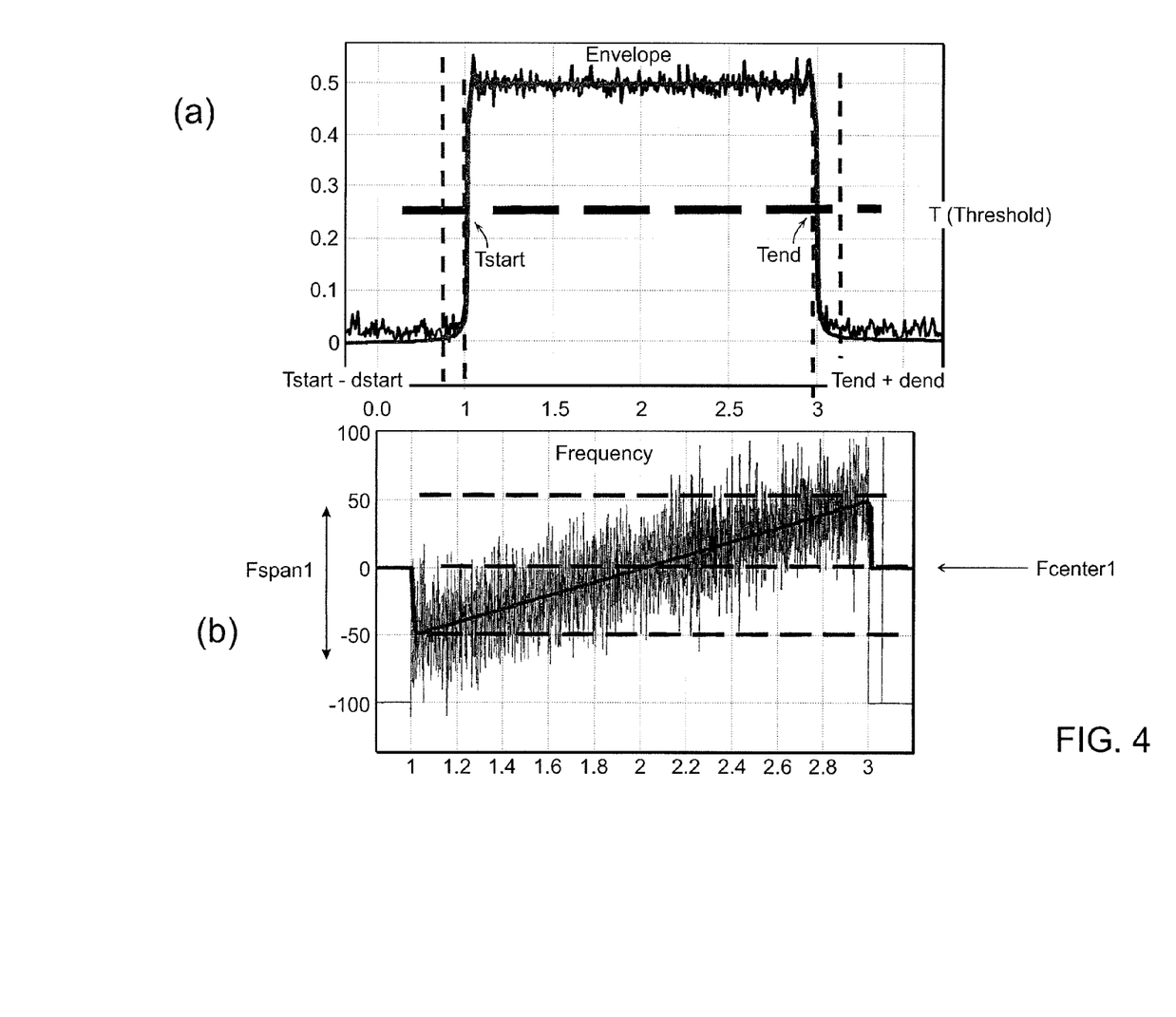
FIG. 4 illustrates an exemplary detection of RF pulse start and end times, frequency span and center frequency in an exemplary first stage I/Q processor.

The first-stage signal envelope calculated by First-stage I/Q processor 12 is used to generate the magnitude pulse start and end pulse trigger signals by comparing envelope values E1(t) with and amplitude threshold T (FIG. 4(a)). The detected RF pulse start time tstart is determined by the threshold crossing E1(tstart)>T. Similarly, the pulse end time tend is detected by finding the threshold crossing E1(tend)<T.

Typical RF pulses have certain rise and fall times. Therefore, in order to capture beginning and end of the RF pulse, a number of samples prior and following the threshold crossings have to be processed.

In order to capture beginning of the RF pulse, Data Address Generator 13 generates a write trigger signal given by tstart-dstart, where dstart specifies a number of samples which have to be processed prior to the threshold crossing. This operation is possible in a real time implementation since I1 and Q1 samples are taken from the output of delay module 11, while the first stage I/Q processor operates on I1 and Q1 samples without delay. Once a write trigger signal is generated by data address generator 13, the I1 and Q1 samples are written to I/Q Memory 1 (10) with a memory address corresponding to the RF pulse start.

In order to process relevant I1 and Q1 samples corresponding to the end of the RF pulse, the detected threshold crossing tend is delayed by time dend (FIG. 4(a)) which is determined by the expected RF pulse fall time. The value of dend can be similar to or different from the value dstart. This causes data address generator 13 to terminate a write operation to I/Q Memory 10. A corresponding memory address generated by DAG 13 determines the RF pulse end. At the same time, data address generator 13 issues a read command from I/Q Memory 10 starting from the memory address corresponding to the RF pulse start.

Upon generation of read operation from I/Q Memory 10, first-stage I1 and Q1 samples are forwarded to second stage DDC module 200. This read operation continues until RF pulse end address is reached.

First-stage I/Q processor 13 calculates estimates of first-stage phase and frequency:

$$\phi 1(t) = \text{arctg}\left(\frac{Q1(t)}{I1(t)}\right)$$

$$f1(t) = \frac{d\phi 1(t)}{dt}$$

These values are calculated within a detected trigger window (i.e., between the RF pulse start and end time) to discard noisy phase and frequency variations when the RF pulse is not present. Estimates of the first-stage frequency span Fspan1 and first-stage center frequency Fcenter1 are determined from the calculated frequency (FIG. 4(b)). The frequency span Fspan1 is calculated as the maximum change of frequency during the pulse duration. Taking into account that the frequency estimate f1 is noisy, the calculated value is adjusted with a value of frequency span margin. This value is required to guarantee that the calculated frequency span is not underestimated, and all frequency components will be covered by the second stage DDC operation. The frequency span margin value is chosen based on the expected frequency noise value. For example, if the RMS value of the frequency noise is expected to be 25 MHz, the span margin is taken as twice this value.

In order to estimate the RF pulse center frequency Fcenter1, the middle value of the frequency span is taken. This center frequency is relative to the first stage LO DDC frequency. For example, if the first-stage LO frequency equals 500 MHz, and the original RF pulse center frequency was 400 MHz, the first-stage IQ processor will report negative 100 MHz. However, if the original RF pulse was centered at 600 MHz, then the IQ processor will report positive 100 MHz. The absolute value of the center frequency determines the frequency of the second-stage down-conversion, while the sign of the center frequency determines the sign of the second-stage LO sine component as will be described in the next section.

When the first-stage I/Q processor 12 determines the RF pulse parameters and detects the pulse end, data samples from first stage I/Q memory buffer 10 are forwarded to second-stage DDC module 200. Note that the second-stage DDC operation can be started only after the end of RF pulse detection in the first stage, i.e. two-stage operation introduces a processing delay which is equal to or larger than the RF pulse duration. In a real-time mode, first-stage DDC module 100 does not introduce a processing delay and the second-stage DDC is started immediately after the RF pulse ends. Depending on system performance, the first stage DDC may not operate in real time. In this case, a stream of ADC samples is taken from an optional sample memory.

Parameters of second-stage DDC 200 are set based on the output of first-stage I/Q processor 12. As seen in FIG. 3, the second-stage DDC module 200 has local oscillator 21, generating sine and cosine functions centered at the absolute value of f2=Fcenter1. First-stage I1/(t) and Q1(t) samples are multiplied by cos(f2*t) and sin(f2*t) in multipliers 22, 23, 24 and 25. The sign of the sine component is reversed for negative values of the first stage center frequency Fcenter1.

Raw second-stage quadrature components I2(t) and Q2(t) are formed using the following summation performed by combining outputs of multipliers 22, 23, 24, 25 in adder 26 and subtract module 27:

$$I_2(t)=I_1(t)*\cos(Fcenter1*t)-\text{sign}(Fcenter1)*Q_1(t)*\sin(Fcenter1*t)$$

$$Q_2(t)=\text{sign}(Fcenter1)*I_1(t)*\sin(FCenter1*t)+Q_1(t)*\cos(Fcenter1*t)$$

Second-stage Low Pass filters LPF2 28 and 29 bandwidth are set to 50% of the first-stage frequency span: Frequency Span 2=Fspan1/2; second-stage decimators DS2 30 and 31 have decimation rates determined by the ratio of the first stage to second stage LPF bandwidth.

This sequence of operations provides a correct second down-conversion stage which is adjusted to the center frequency and span of the detected RF pulse. Generated I2(t) and Q2(t) samples can then be processed by second-stage I/Q processor 41, which performs envelope, phase and frequency calculations with optimal parameters, e.g.

$$E2(t) = \sqrt{I2(t)^2 + Q2(t)^2}$$

$$\phi2(t) = \arctg\left(\frac{Q2(t)}{I2(t)}\right)$$

$$f2(t) = \frac{d\phi2(t)}{dt}$$

Figure 5:
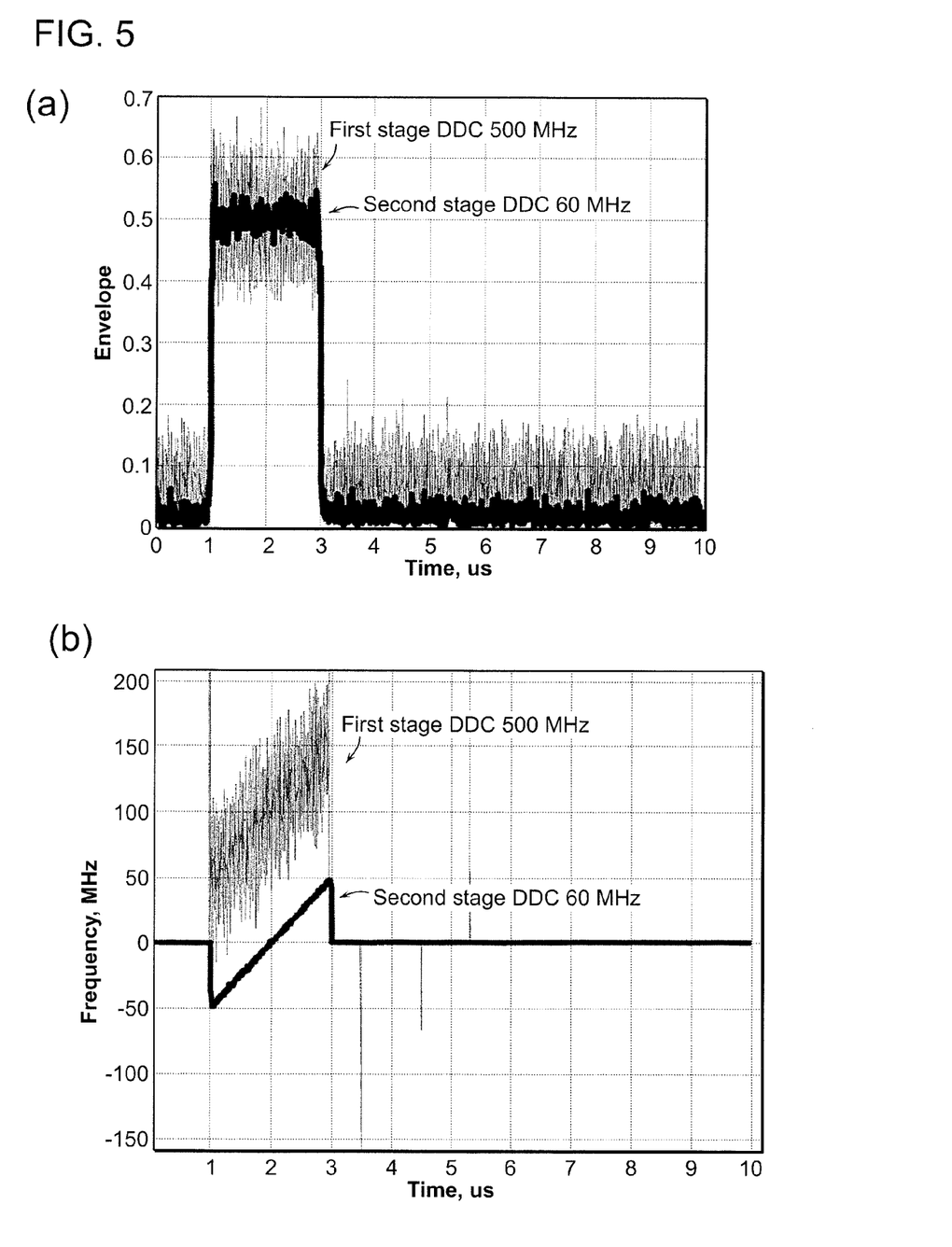
FIG. 5 depicts results of DDC detection with a first stage only, and with and optimal two-stage system (FIG. 5(*a*)—pulse envelope)

While these calculations are similar to first-stage I/Q processing, they are based on correct narrow-band frequency span and detection bandwidth, therefore resulting in optimal RF pulse detection and best achievable SNR. The results of second stage I/Q processor 41 output and first stage I/Q processor output are illustrated on FIG. 5 for calculation of the RF pulse envelope and frequency. First stage DDS was done in a 500 MHz bandwidth, while second stage in a 60 MHz bandwidth (the initial RF pulse frequency span equals 100 MHz). As seen, the quality of the second stage DDC is higher: the envelope noise after the second stage is smaller, and the frequency estimate of noise is significantly reduced and center frequency is reduced to zero.

Down-converted I2(t) and Q2(t) samples are stored in second stage I/Q memory 40, or in an external storage device, for subsequent analysis of pulse data, statistical analysis of multiple RF pulse parameters, etc. In a real-time operation mode, the beginning and end of the write operation for I/Q memory 40, is determined by trigger 2, generated by read/write data address generator 13.

Generation of quadrature signals I2(t) and Q2(t) described above, is optimal for two-stage down-conversion, canceling additional noise in the second DDC bandwidth, and is equivalent to a single-stage DDC using optimal parameters (center frequency and span). However, second-stage conversion can be simplified by taking only one first-stage quadrature component, e.g. I1(t) and ignoring Q1(t) (i.e. setting Q1(t) to zero and ignoring all calculations related to Q1(t) component). However, in this case, the detected second-stage down-converted signal has a double noise power in the second bandwidth, resulting in a 3 dB SNR loss in the detected signal.

Although this technology has been described in terms of certain embodiments, other embodiments that are apparent to those skilled in the art, including embodiments which do not provide all the benefits and features are also within the scope of this disclosure. For example, different implementations of the first and second stage I/Q processors are possible using dedicated FPGA or digital processors. The first stage DDC may operate in real time, or be delayed and take ADC samples from memory. The Delay buffer and I/Q memory may be part of a deep sample memory. Accordingly, the scope of the present disclosure is defined only by reference to the claims.

What is claimed is:

1. A two-stage digital down-conversion system, comprising:
   A. an analog to digital converter (ADC) responsive to an applied analog signal, generating a digital output signal at a digital output, wherein the digital output is represented by a succession of digital samples, representing succession of samples of the input signal;

B. a first-stage digital down-conversion (DDC) module generating first-stage quadrature digital components I1 and Q1, comprising:
  i. first stage digital local oscillator (LO), generating sine and cosine signals at first stage frequency;
  ii. first stage multipliers, generating sequence of digital data being the product of ADC samples and first stage LO sine and cosine signals;
  iii. first stage Low pass filters, having cutoff frequency at first-stage bandwidth of output of first stage multipliers; and
  iv. first stage decimators, providing first-stage down-sampling of output of first stage low pass filters;
C. a first stage I/Q memory for storing first-stage quadrature data;
D. a first stage I/Q processor module, performing first-stage amplitude envelope, phase and frequency detection
E. a second stage DDC module, generating second-stage quadrature components I2/Q2, based on first stage I1/Q1 quadrature components, comprising:
  i. A second stage digital local oscillator (LO), generating second-stage sine and cosine signals at second stage frequency f2 as cos(f2*t) and sin(f2*t);
  ii. an inverter, reversing the sign of sine LO component if the sign value calculated by first-stage I/Q processor is negative;
  iii. second stage multipliers, generating products of first-stage quadrature I1 and Q1 digital samples with second-stage sine and cosine functions;
  iv. adders, forming sum and difference of multiplier outputs as $$I_2(t)=I_1(t)*\cos(f2*t)-\text{Sign}*Q_1(t)*\sin(f2*t)$$

$$Q_2(t)=\text{Sign}*I_1(t)*\sin(f2*t)+Q_1(t)*\cos(f2*t)$$

v. second stage low pass filters having a second stage bandwidth; and
  vi. second stage decimators, having second stage decimation rate.

2. A two-stage digital down-conversion system of claim 1, wherein first stage I/Q processor output includes an RF pulse trigger, characterized by a frequency span, a center frequency and a center frequency sign.

3. A two-stage digital down-conversion system of claim 1, having a second stage I/Q processor, receiving data from the first stage I/Q memory and performing a second-stage envelope, phase and frequency calculation.

4. A two-stage digital down-conversion system of claim 1, having memory for storing samples from the second stage I/Q memory for consecutive analysis and calculation of multiple RF pulse statistics.

5. A two-stage digital down-conversion system of claim 1, wherein the first stage DDC module is implemented in FPGA.

6. A two-stage digital down-conversion system of claim 1, wherein the second stage DDC module is implemented in FPGA.

7. A two stage digital down-conversion system of claim 1, wherein Q1(t) is set to zero in order to provide faster second stage DDC with 3 dB SNR penalty.

8. A two-stage digital down-conversion system of claim 1, having means for storing output of second-stage I/Q processor for consecutive analysis and calculation of multiple RF pulse statistics.

9. A two-stage digital down-conversion system of claim 2, wherein a second stage DDC local oscillator frequency, low pass filter bandwidth and down-sampling ratio are set in accordance with the first stage I/Q processor output.

10. A two-stage digital down-conversion system of claim 2, wherein the first stage quadrature samples are delayed in a delay buffer prior to storage in the first stage I/Q memory.

11. A two-stage digital down-conversion system of claim 10, wherein the RF pulse trigger determines a range of the first stage I/Q samples stored in the first stage I/Q memory.

12. A two-stage digital down-conversion system of claim 11, wherein the RF pulse trigger determines a range of the first stage I/Q samples processed by the second stage DDC.

13. A two-stage digital down-conversion method for optimal detection of RF Pulse parameters, comprising the steps of:
  A. performing first digital down conversion of digitized input samples at first local oscillator frequency with first bandwidth and first decimation rate;
  B. processing first set of quadrature I/Q data and finding first stage estimates of RF pulse start/stop time, frequency span and center frequency
  C. performing second digital down-conversion on first set of I/Q data using second local oscillator frequency f2 and frequency span determined by first Down-conversion processing, second DDC quadrature components derived as:

$$I_2(t)=I_1(t)*\cos(f2*t)-Q_1(t)*\sin(f2*t)$$

$$Q_2(t)=I_1(t)*\sin(f2*t)+Q_1(t)*\cos(f2*t)$$

D. calculating RF pulse amplitude, phase and frequency based on second down-conversion outputs, thus providing optimal detection of RF pulse parameters.

14. A method of claim 13 wherein the bandwidth of the second down-conversion is set to 50% of the frequency span detected from the first set of I/Q data.

15. A method of claim 13 wherein the second down-conversion is performed only on one quadrature component to achieve higher processing speed with 3 dB SNR loss.

* * * * *